United States Patent
Kim et al.

(10) Patent No.: US 9,237,382 B2
(45) Date of Patent: Jan. 12, 2016

(54) CONTENT RELAYING SCHEME

(71) Applicant: KT Corporation, Seongnam-si, Gyeonggi (KR)

(72) Inventors: Jong-heum Kim, Seongnam-si (KR); Suho Park, Seoul (KR); Sun-jong Kwon, Seoul (KR); Gyu-tae Baek, Seoul (KR)

(73) Assignee: KT CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/067,258

(22) Filed: Oct. 30, 2013

(65) Prior Publication Data

US 2014/0123199 A1    May 1, 2014

(30) Foreign Application Priority Data

Oct. 30, 2012 (KR) ........................ 10-2012-0121102

(51) Int. Cl.
| | |
|---|---|
| H04N 21/2343 | (2011.01) |
| H04N 21/258 | (2011.01) |
| H04N 21/266 | (2011.01) |
| H04N 21/61 | (2011.01) |
| H04N 21/643 | (2011.01) |
| H04N 21/4363 | (2011.01) |
| H04N 21/6405 | (2011.01) |
| H04N 21/647 | (2011.01) |
| H04H 20/02 | (2008.01) |
| H04H 20/38 | (2008.01) |
| H04H 60/85 | (2008.01) |
| H04H 60/88 | (2008.01) |
| H04L 29/06 | (2006.01) |
| H04W 12/06 | (2009.01) |
| H04H 20/82 | (2008.01) |

(52) U.S. Cl.
CPC .......... *H04N 21/6175* (2013.01); *H04H 20/02* (2013.01); *H04H 20/38* (2013.01); *H04H 60/85* (2013.01); *H04H 60/88* (2013.01); *H04L 65/4076* (2013.01); *H04L 65/604* (2013.01); *H04N 21/25816* (2013.01); *H04N 21/43637* (2013.01); *H04N 21/6125* (2013.01); *H04N 21/6405* (2013.01); *H04N 21/64322* (2013.01); *H04N 21/64707* (2013.01); *H04W 12/06* (2013.01); *H04H 20/82* (2013.01)

(58) Field of Classification Search
None
See application file for complete search history.

(56) References Cited

U.S. PATENT DOCUMENTS

| | | | | |
|---|---|---|---|---|
| 2009/0147718 | A1* | 6/2009 | Liu | ..................... H04L 12/1863 370/312 |
| 2011/0055862 | A1* | 3/2011 | Harp | .................. H04N 7/17318 725/25 |

FOREIGN PATENT DOCUMENTS

| | | |
|---|---|---|
| KR | 10-0861239 B | 10/2008 |
| KR | 1020110060675 A | 6/2011 |
| KR | 1020120046911 A | 5/2012 |

*Primary Examiner* — Brian T Pendleton
*Assistant Examiner* — Jean D Saint Cyr
(74) *Attorney, Agent, or Firm* — Brundidge & Stanger, P.C.

(57) ABSTRACT

In one example embodiment, a system includes an internet protocol television server configured to transmit a first-internet protocol multicast stream of internet protocol television content; a wireless router configured to: receive, from the internet protocol television server, the first-internet protocol multicast stream, convert the first-internet protocol multicast stream into a second-internet protocol unicast stream, and transmit the second-internet protocol unicast stream via a wireless network; and an end device configured to: transmit a request for the internet protocol television content to the wireless router, and receive the second-internet protocol unicast stream from the wireless router.

11 Claims, 6 Drawing Sheets

CONTENT RELAYING SCHEME

TECHNICAL FIELD

The embodiments described herein pertain generally to schemes for relaying internet protocol television content.

BACKGROUND

An IPTV (Internet Protocol Television) service provider provides a service that integrates a security of a telecommunication network, content provided by a broadcast television network and features of the Internet; and provides voice, data, and video services over one connection simultaneously. Therefore, a user can not only make calls, access the Internet, and watch TV, but also enjoy more data, voice, and video integrated services through the IPTV service, serially or in parallel.

SUMMARY

In one example embodiment, a system includes an internet protocol television server configured to transmit a first-internet protocol multicast stream of internet protocol television content; a wireless router configured to: receive, from the internet protocol television server, the first-internet protocol multicast stream, convert the first-internet protocol multicast stream into a second-internet protocol unicast stream, and transmit the second-internet protocol unicast stream via a wireless network; and an end device configured to: transmit a request for the internet protocol television content to the wireless router, and receive the second-internet protocol unicast stream from the wireless router.

In another example embodiment, a wireless router includes a request receiving unit configured to receive a request for internet protocol television content from an end device that is authenticated by an internet protocol television server; a content receiving unit configured to receive, from the internet protocol television server, a first-internet protocol multicast stream; a protocol converting unit configured to convert the first-internet protocol multicast stream into a second-internet protocol unicast stream; and a transmitting unit configured to transmit the second-internet protocol unicast stream to the authenticated end device via a wireless network.

In yet another example embodiment, a method performed under control of a wireless router includes receiving a request for internet protocol television content from an end device that is authenticated by an internet protocol television server; receiving a first-internet protocol multicast stream of the requested internet protocol television content from the internet protocol television server; converting the first-internet protocol multicast stream into a second-internet protocol unicast stream; and transmitting the second-internet protocol unicast stream to the authenticated end device via a wireless network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
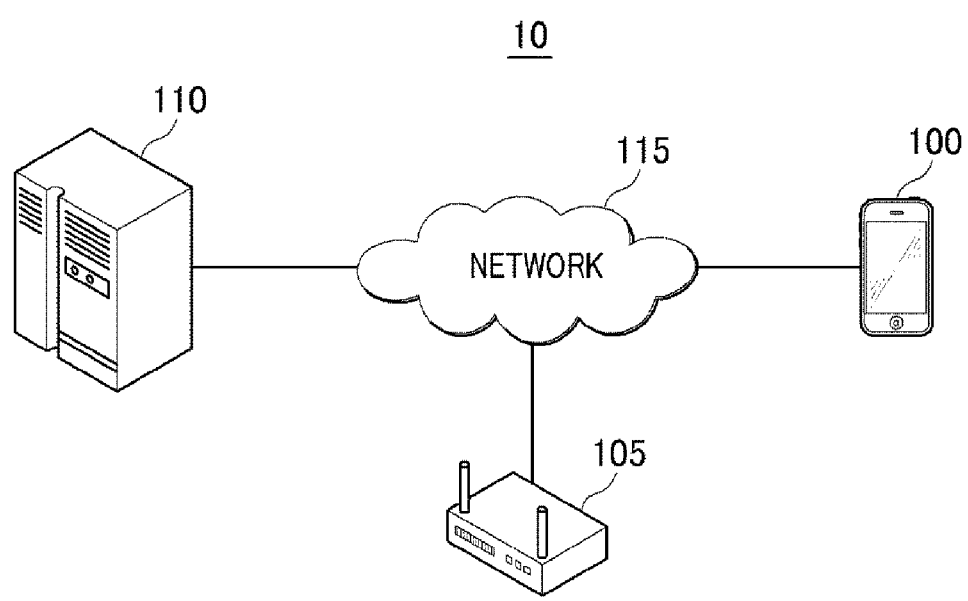
FIG. 1 shows an example system configuration in which one or more embodiments of a content relaying scheme may be implemented.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration in which one or more embodiments of a content relaying scheme may be implemented. As depicted in FIG. 1, a system configuration 10 may include, at least, an end device 100, a wireless router 105 and an internet protocol television (IPTV) server 110. At least two or more of end device 100, wireless router 105 and internet protocol television (IPTV) server 110 may be communicatively connected to each other via a network 115.

By way of example, but not limitation, network 115, which may be configured to communicatively couple one or more of end device 100, wireless router 105 and IPTV server 110, may be implemented in accordance with any wireless network protocol, such as a mobile radio communication network including at least one of a 3rd generation (3G) mobile telecommunications network, a 4th generation (4G) mobile telecommunications network, and any other mobile telecommunications networks, a satellite network, Bluetooth, WiBro (Wireless Broadband Internet), Mobile WiMAX, HSDPA (High Speed Downlink Packet Access) or the like.

End device 100 may refer to a notebook computer, a personal computer, a smart phone, a tablet device, a phablet device, a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminals.

Further, IPTV server 110 may refer to service providing organization or entity that provides real-time broadcasting services, video-on-demand (VOD) services, and/or user interactive services (e.g., a game) to end device 100. IPTV server 110 may host one or more servers or other processing apparatuses that may be configured to provide IPTV content to multiple devices including end device 100. Non-limiting examples of IPTV server 110 may include an Internet service provider (ISP); application service provider (ASP); storage service provider (SSP); and television service provider, i.e., cable TV, DSL and DBS. By way of example, but not limitation, the IPTV content may include real-time content or video on demand (VOD) content.

In some embodiments, IPTV server 110 may be configured to authenticate end device 100 based on authenticating information corresponding to end device 100. By way of example, but not limitation, the authenticating information corresponding to end device 100 may include at least one of a media access control (MAC) address, an internet protocol (IP) address, a serial number, and/or a unique identifier. In some embodiments, IPTV server 110 may be configured to pre-register or store the authenticating information corresponding to end device 100 utilizing any one of various types of previous registration processes (e.g., log-in process or signing up for service membership) between end device 100 and IPTV server 110. Further, IPTV server 110 may be configured to receive the authenticating information from end device 100, and to compare the stored authenticating information and the received authenticating information.

Further, IPTV server 110 may be configured to authenticate wireless router 105 based on authenticating information corresponding to wireless router 105. For example, the authenticating information corresponding to wireless router 105 may include at least one of a MAC address, an IP address, a serial number, and/or a unique identifier. In some embodiments, IPTV server 110 may be configured to pre-register or store the authenticating information corresponding to wireless router 105 utilizing any one of various types of previous registration processes between wireless router 105 and IPTV server 110. Further, IPTV server 110 may be configured to receive the authenticating information from wireless router 105, and to compare the stored authenticating information and the received authenticating information.

Further, in some embodiments, IPTV server 110 may be configured to transmit, to end device 100, channel information that includes at least one of the IP address of IPTV server 110, the port number of IPTV server 110, or multiple channel identifiers of multiple content that IPTV server 110 provides to end device 100.

In some other embodiments, IPTV server 110 may be configured to transmit the channel information to wireless router 105, which, in turn, may be configured to transmit the received channel information to end device 100.

End device 100 may be configured to transmit a request for IPTV content to wireless router 105. By way of example, but not limitation, end device 100 may be configured to transmit the request to wireless router 105, via information that includes an IP address of wireless router 105 and a port number of wireless router 105. The information regarding the IP address and the port number of wireless router 105 may be provided to end device 100, when end device 100 is coupled to wireless router 105 through network 115. Further, the request for the IPTV content, which may be transmitted by end device 100, may include the IP address of wireless router 105, the port number of wireless router 105, the IP address of IPTV server 110, the port number of IPTV server 110, and a channel identifier of the IPTV content.

Wireless router 105 may be configured to receive the request for the IPTV content from end device 100. Further, wireless router 105 may be configured to transmit a request for the requested IPTV content to IPTV server 110. In some embodiments, wireless router 105 may be configured to detect, from the request received from end device, the IP address of IPTV server 110, the port number of IPTV server 110 and the channel identifier of the requested content. Wireless router 105 may be configured to then transmit, to IPTV server 110, a request including the channel identifier of the requested content by using the detected IP address and port number of IPTV server 110.

Wireless router 105 may be further configured to receive a first-internet protocol multicast stream of the IPTV content from IPTV server 110. By way of example, but not limitation, the first-internet protocol multicast stream may include at least one of a user data protocol (UDT) broadcast stream or a real-time transport protocol (RTP) broadcast stream.

In some embodiments, wireless router 105 may be configured to detect the IP address and the port number of IPTV server 110 from the request received from end device 100. Alternatively, wireless router 105 may be configured to detect the IP address and the port number of IPTV server 110 from the channel information, which may be received from IPTV server 110. Wireless router 105 may be configured to receive the first-internet protocol multicast stream via an internet group management protocol (IGMP) implemented between wireless router 105 and IPTV server 110, based on the detected IP address and port number of IPTV server 110.

Further, wireless router 105 may be configured to convert the first-internet protocol multicast stream into a second-internet protocol unicast stream of the IPTV content. By way of example, but not limitation, the second-internet protocol unicast stream may include at least one of a transmission control protocol (TCP) broadcast stream or an http live streaming (HLS) broadcast stream.

In some embodiments, wireless router 105 may be configured to analyze a header layer of the first-internet protocol multicast stream, and to convert the first-internet protocol multicast stream into the second-internet protocol unicast stream based at least in part on header information that is written in the header layer. By way of example, but not limitation, the header information may include a sequence number of the first-internet protocol multicast stream and a time stamp value pertaining to an image frame encoding frequency of the IPTV content.

Wireless router 105 may be configured to divide the first-internet protocol multicast stream, and to convert the divided first-internet protocol multicast stream into multiple second-internet protocol packets based on the header information. Wireless router 105 may be further configured to generate a sequence file to inform end device 100 of a converted sequence of the multiple second-internet protocol packets. By way of example, the sequence file may include index information of each of the multiple second-internet protocol packets and sequence information of the multiple second-internet protocol packets. By way of example, but not limitation, the second-internet protocol packets may have a moving picture experts group-2 transport stream (MPEG-2 TS) format and the sequence file may have an M3U8 file format.

In some embodiments, wireless router 105 may be configured to update the sequence file in real-time or within a predetermined time interval, when wireless router 105 completes converting the divided first-internet protocol multicast stream into the second-internet protocol packets.

Wireless router 105 may be further configured to transmit the second-internet protocol unicast stream to end device 100, via network 115. In some embodiments, wireless router 105 may be configured to transmit the multiple second-internet protocol packets and the sequence file to end device 100. By way of example, but not limitation, the sequence file may include a uniform resource locator (URL) to be called for the purpose of the aforementioned transmission of the multiple second-internet protocol packets. End device 100 may be configured to obtain the URL from the sequence file, and call the URL to receive the multiple second-internet protocol packets based on user activation (i.e., a click) on the URL or automatically.

In some embodiments, wireless router 105 may be configured to analyze a payload type of the first-internet protocol multicast stream, which may include information regarding an encoding type of the first-internet protocol multicast stream. Wireless router 105 may be configured to transcode a first encoding type of the first-internet protocol multicast stream to a second encoding type. By way of example, but not limitation, the first encoding type may refer to an encoding type that is not decodable by end device 100, such as an H.264 HIGH PROFILE video codec, an H.264 MAIN PROFILE video codec, an AC-3 audio codec, etc. Further, the second encoding type may refer to an encoding type that is decodable by end device 100, such as an H.264 BASELINE PROFILE video codec, an AAC audio codec, etc.

Further, wireless router 105 may be configured to convert the first-internet protocol multicast stream, of which the first encoding type may be transcoded into the second encoding type, into the second-internet protocol unicast stream, and transmit the second-internet protocol unicast stream to end device 100. End device 100 may be configured to receive the second-internet protocol unicast stream, which may be encoded by the second encoding type. End device 100 may be further configured to decode the second-internet protocol unicast stream, and display the IPTV content.

Thus, FIG. 1 shows an example system configuration 10 in which one or more embodiments of a content relaying scheme may be implemented.

Figure 2:
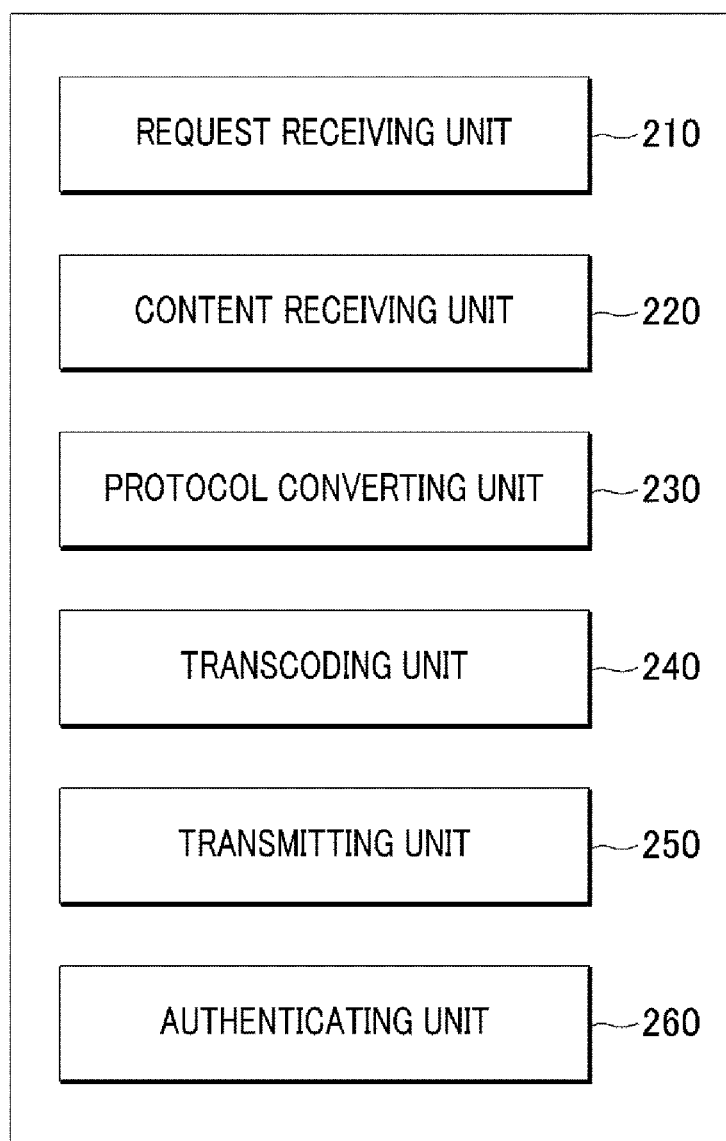
FIG. 2 shows an example configuration of a wireless router by which at least portions of a content relaying scheme may be implemented.

FIG. 2 shows an example configuration of a wireless router by which at least portions of a content relaying scheme may be implemented. As depicted in FIG. 2, wireless router 105 may include a request receiving unit 210, a content receiving unit 220, a protocol converting unit 230, a transcoding unit 240, a transmitting unit 250 and an authenticating unit 260. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of request receiving unit 210, content receiving unit 220, protocol converting unit 230, transcoding unit 240, transmitting unit 250 and authenticating unit 260 may be included in an instance of an application hosted on wireless router 105.

Request receiving unit 210 may be configured to receive a request for IPTV content from end device 100. In some embodiments, end device 100 may be previously authenticated by and coupled to wireless router 105 and IPTV server 110. The received request for the IPTV content may include an IP address and a port number of wireless router 105, an IP address and a port number of IPTV server 110 and a channel identifier of the requested IPTV content.

Content receiving unit 220 may be configured to receive, from IPTV server 110, channel information that includes at least one of the IP address and the port number of IPTV server 110, or multiple channel identifiers of multiple content that IPTV server 110 provides to end device 100.

Further, content receiving unit 220 may be configured to transmit a request for the IPTV content, which is requested by end device 100, to IPTV server 110. In some embodiments, content receiving unit 220 may be configured to transmit a request for a first-internet protocol multicast stream of the IPTV content to IPTV server 110. By way of example, but not limitation, the first-internet protocol multicast stream may include at least one of a UDT broadcast stream or a RTP broadcast stream.

Further, content receiving unit 220 may be configured to receive the IPTV content from IPTV server 110 in response to the request. In some embodiments, content receiving unit 220 may be configured to receive the first-internet protocol multicast stream of the IPTV content from IPTV server 110. By way of example, content receiving unit 220 may be configured to detect the IP address and the port number of IPTV server 110 from the content request transmitted from end device 100. Alternatively, content receiving unit 220 may be configured to detect the IP address and the port number of IPTV server 110 from the channel information, which may be transmitted from IPTV server 110. Content receiving unit 220 may be configured to receive the first-internet protocol multicast stream via an IGMP implemented between wireless router 105 and IPTV server 110, based on the detected IP address and port number of IPTV server 110.

Protocol converting unit 230 may be configured to convert the first-internet protocol multicast stream into a second-internet protocol unicast stream of the IPTV content. By way of example, but not limitation, the second-internet protocol unicast stream may include at least one of a TCP broadcast stream or an HLS broadcast stream.

In some embodiments, protocol converting unit 230 may be configured to analyze a header layer of the first-internet protocol multicast stream, and to convert the first-internet protocol multicast stream into the second-internet protocol unicast stream based at least in part on header information that may be written in the header layer. By way of example, but not limitation, the header information may include a sequence number of the first-internet protocol multicast stream and a time stamp value pertaining to an image frame encoding frequency of the IPTV content. Protocol converting unit 230 may be configured to divide the first-internet protocol multicast stream, and to convert the first-internet protocol multicast stream into multiple second-internet protocol packets based on the header information. Protocol converting unit 230 may be further configured to generate a sequence file to inform end device 100 of a converted sequence of the multiple second-internet protocol packets. By way of example, but not limitation, the second-internet protocol packets may have a moving picture experts group-2 transport stream (MPEG-2 TS) format and the sequence file may have an M3U8 file format.

Further, protocol converting unit 230 may be configured to update the sequence file in real-time or with a predetermined time interval, when protocol converting unit 230 completes the converting of the first-internet protocol multicast stream into the second-internet protocol packets.

Transcoding unit 240 may be configured to analyze a payload type of the first-internet protocol multicast stream, which includes information regarding an encoding type of the first-internet protocol multicast stream. Further, transcoding unit 240 may be configured to transcode a first encoding type of the first-internet protocol multicast stream to a second encoding type that may be decoded by end device 100 based on the payload type information. By way of example, but not limitation, the first encoding type may refer to an encoding type that is not decodable by end device 100, such as an H.264 HIGH PROFILE video codec, an H.264 MAIN PROFILE video codec, an AC-3 audio codec, etc. Further, the second encoding type may refer to an encoding type that is decodable by end device 100, such as an H.264 BASELINE PROFILE video codec, an AAC audio codec, etc.

Transmitting unit 250 may be configured to transmit the second-internet protocol unicast stream to end device 100, which is authenticated by at least one of wireless router 105 or IPTV server 110, via network 115. In some embodiments, transmitting unit 250 may be configured to transmit the multiple second-internet protocol packets and the sequence file to end device 100. By way of example, but not limitation, the sequence file may include a URL to be called for the purpose of transmission of the multiple second-internet protocol packets. End device 100 may obtain the URL from the sequence file and call the URL to receive the multiple second-internet protocol packets, based on user activation (i.e., a click) on the URL or automatically.

Further, transmitting unit 250 may be configured to transmit the channel information, which may be received by content receiving unit 220, to end device 100.

Authenticating unit 260 may be configured to transmit authenticating information of wireless router 105 to IPTV server 110. By way of example, but not limitation, the authenticating information of wireless router 105 may include at least one of a MAC address of wireless router 105, an IP address of wireless router 105, a serial number assigned to wireless router 105, or a unique identifier of wireless router 105. IPTV server 110 may authenticate wireless router 105 based on the authenticating information, and transmit the first-internet protocol multicast stream to authenticated wireless router 105.

Thus, FIG. 2 shows an example configuration of wireless router 105 by which at least portions of a content relaying scheme may be implemented.

Figure 3:
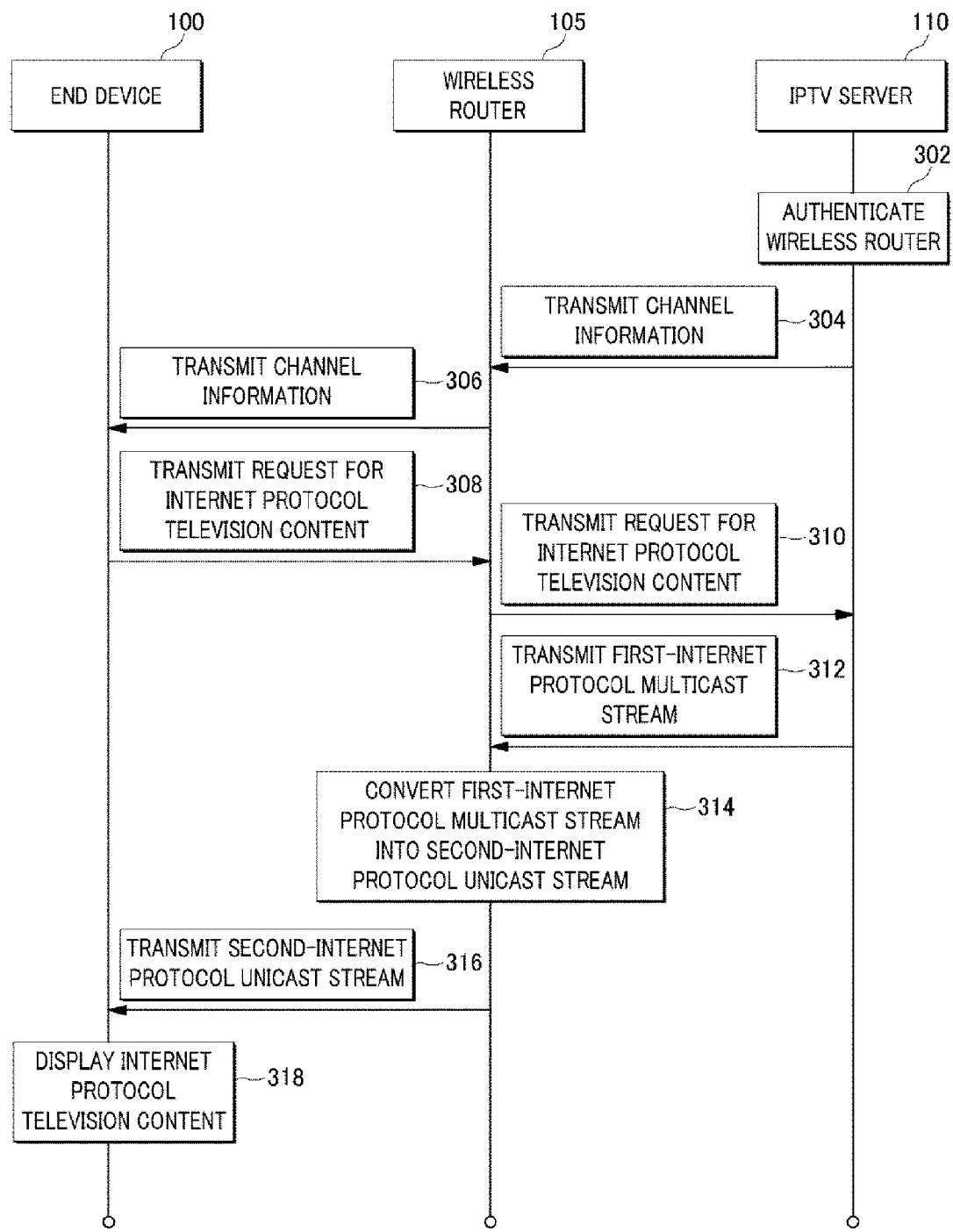
FIG. 3 shows an example processing flow of operations by which at least portions of a content relaying scheme may be implemented.

FIG. 3 shows an example processing flow of operations by which at least portions of a content relaying scheme may be implemented. The operations in FIG. 3 may be implemented in system configuration 10 including end device 100, wireless router 105 and IPTV server 110, as illustrated in FIG. 1. An example process may include one or more operations, actions, or functions as illustrated by one or more blocks 302, 304, 306, 308, 310, 312, 314, 316 and/or 318. Although illustrated as discrete blocks, various blocks may be divided into additional blocks, combined into fewer blocks, or eliminated, depending on the desired implementation. Processing may begin at block 302.

Block 302 (Authenticate Wireless Router) may refer to IPTV server 110 authenticating wireless router 105. In some embodiments, wireless router 105 may transmit authenticating information of wireless router 105 to IPTV server 110. Further, IPTV server 110 may receive the authenticating information, and authenticate wireless router 105 based on the received authenticating information. By way of example, but not limitation, IPTV server 110 may pre-register or store the authenticating information of wireless router 105 using one of various types of pre-registration processes, and compare the stored authenticating information and the received authenticating information. Processing may proceed from block 302 to block 304.

Block 304 (Transmit Channel Information) may refer to IPTV server 110 transmitting channel information to wireless router 105, which may be authenticated at block 302. By way of example, but not limitation, the channel information may include at least one of an IP address of IPTV server 110, a port number of IPTV server 110, or multiple channel identifiers of multiple content that IPTV server 110 provides to end device 100. Processing may proceed from block 304 to block 306.

Block 306 (Transmit Channel Information) may refer to wireless router 105 transmitting, to end device 100, the channel information which may be transmitted from IPTV server 110 at block 304. Processing may proceed from block 306 to block 308.

Block 308 (Transmit Request for Internet Protocol Television Content) may refer to end device 100 transmitting a request for IPTV content to wireless router 105, using information including an IP address of wireless router 105 and a port number of wireless router 105. By way of example, end device 100 may search for and detect the information regarding the IP address and the port number of wireless router 105, when end device 100 is coupled to wireless router 105. Alternatively, a user of end device 100 may already have the information regarding the IP address and the port number of wireless router 105 in advance, before end device 100 is coupled to wireless router 105. Further, the request for the IPTV content may include the IP address and the port number of wireless router 105, the IP address and the port number of IPTV server 110 and a channel identifier of the IPTV content. Processing may proceed from block 308 to block 310.

Block 310 (Transmit Request for Internet Protocol Television Content) may refer to wireless router 105 transmitting a request for the IPTV content, which may be requested by end device 100 at block 308, to IPTV server 110. In some embodiments, wireless router 105 may detect the IP address of IPTV server 110, the port number of IPTV server 110 and the channel identifier of the requested content from the request, which may be transmitted from end device 100 at block 308. Then, wireless router 105 may transmit, to IPTV server 110, a request that includes the channel identifier of the requested content by using the detected IP address and port number of IPTV server 110. Processing may proceed from block 310 to block 312.

Block 312 (Transmit First-Internet Protocol Multicast Stream) may refer to IPTV server 110 transmitting a first-internet protocol multicast stream of the IPTV content to wireless router 105. By way of example, but not limitation, the first-internet protocol multicast stream may include at least one of a UDT broadcast stream or a RTP broadcast stream. In some embodiments, wireless router 105 may receive the first-internet protocol multicast stream via an IGMP implemented between wireless router 105 and IPTV server 110, based on the IP address and the port number of IPTV server 110. Processing may proceed from block 312 to block 314.

Block 314 (Convert First-Internet Protocol Multicast Stream into Second-Internet Protocol Unicast Stream) may refer to wireless router 105 converting the first-internet protocol multicast stream into a second-internet protocol unicast stream. By way of example, but not limitation, the second-internet protocol unicast stream may include at least one of a TCP broadcast stream or an HLS broadcast stream.

In some embodiments, wireless router 105 may divide the first-internet protocol multicast stream, and convert the first-internet protocol multicast stream into multiple second-internet protocol packets. Further, wireless router 105 may generate a sequence file to inform end device 100 of a converted sequence of the multiple second-internet protocol packets. By way of example, but not limitation, the second-internet protocol packets may have a moving picture experts group-2 transport stream (MPEG-2 TS) format and the sequence file may have an M3U8 file format. Processing may proceed from block 314 to block 316.

Block 316 (Transmit Second-Internet Protocol Unicast Stream) may refer to wireless router 105 transmitting the second-internet protocol unicast stream to end device 100. In some embodiments, wireless router 105 may transmit the multiple second-internet protocol packets and the sequence file, which are generated at block 314, to end device 100. By way of example, but not limitation, the sequence file may include a URL to be called for the purpose of downloading the multiple second-internet protocol packets. Processing may proceed from block 316 to block 318.

Block 318 (Display Internet Protocol Television Content) may refer to end device 100 displaying the IPTV content. End device 100 may receive the second-internet protocol unicast stream of the IPTV content. By way of example, end device 100 may receive the sequence file, and obtain the URL from the sequence file. Then, end device 100 may call the URL to receive the multiple second-internet protocol packets. End device 100 may decode the multiple second-internet protocol packets and display the IPTV content.

Thus, FIG. 3 shows an example processing flow of operations by which at least portions of a content relaying scheme may be implemented.

Figure 4:
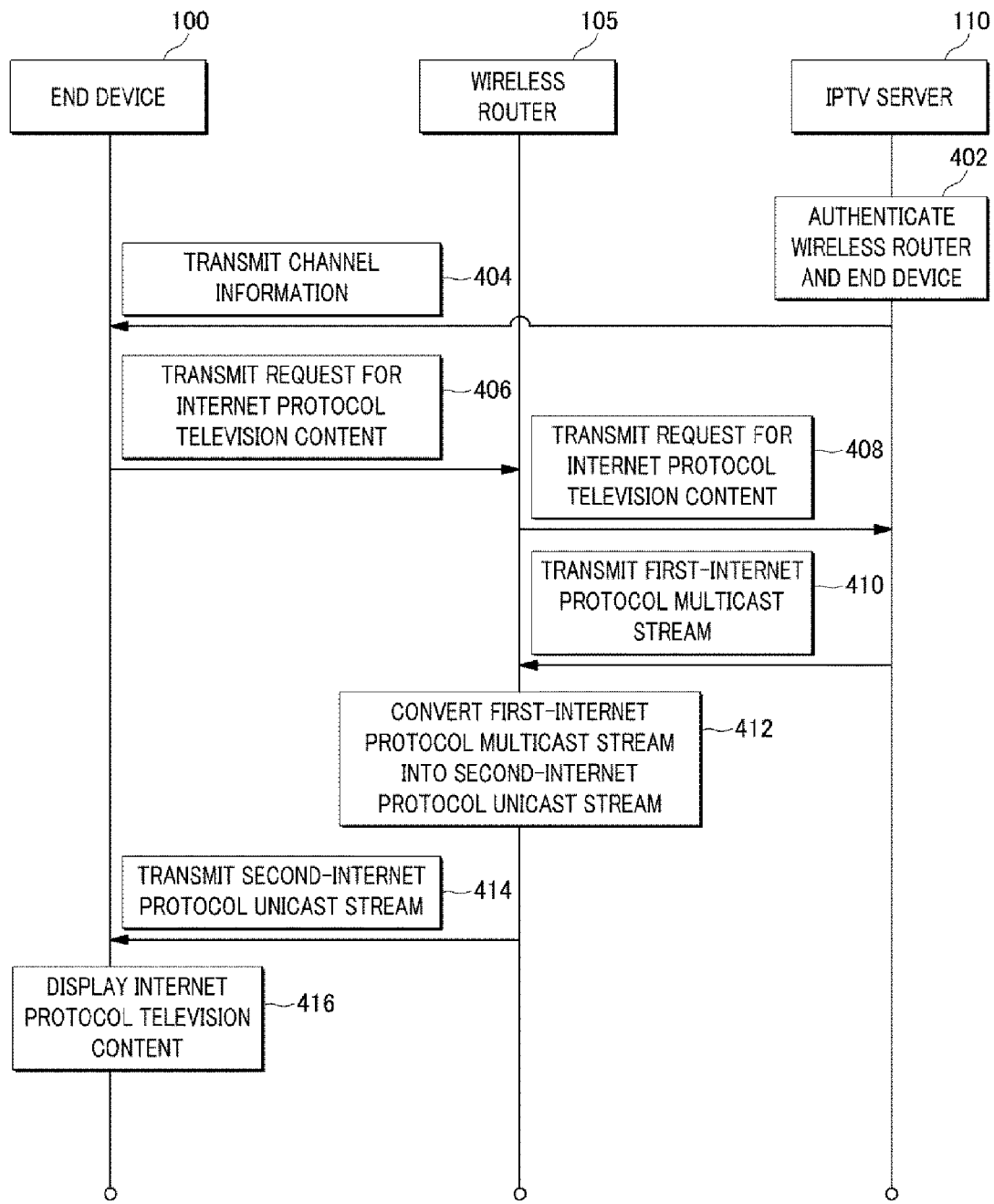
FIG. 4 shows another example processing flow of operations by which at least portions of a content relaying scheme may be implemented.

FIG. 4 shows another example processing flow of operations by which at least portions of a content relaying scheme may be implemented. The operations in FIG. 4 may be implemented in system configuration 10 including end device 100, wireless router 105 and IPTV server 110, as illustrated in FIG. 1. An example process may include one or more operations, actions, or functions as illustrated by one or more blocks 402, 404, 406, 408, 410, 412, 414 and/or 416. Although illustrated as discrete blocks, various blocks may be divided into additional blocks, combined into fewer blocks, or eliminated, depending on the desired implementation. Processing may begin at block 402.

Block 402 (Authenticate Wireless Router and End Device) may refer to IPTV server 110 authenticating wireless router 105 and end device 100. In some embodiments, wireless router 105 may transmit authenticating information corresponding to wireless router 105 to IPTV server 110. Further, end device 100 may transmit authenticating information corresponding to end device 100 to IPTV server 110. Further, IPTV server 110 may authenticate wireless router 105 based on the authenticating information corresponding to wireless router 105, and authenticate end device 100 based on the authenticating information of end device 100. By way of example, but not limitation, the authenticating information corresponding to wireless router 105 or end device 100 may include at least one of a MAC address of wireless router 105 or end device 100, an IP address of wireless router 105 or end device 100, a serial number assigned to wireless router 105 or end device 100, or a unique identifier of wireless router 105 or end device 100. Processing may proceed from block 402 to block 404.

Block 404 (Transmit Channel Information) may refer to IPTV server 110 transmitting channel information to end device 100, which may be authenticated at block 402. By way of example, but not limitation, the channel information may include at least one of an IP address of IPTV server 110, a port number of IPTV server 110, or multiple channel identifiers of multiple content that IPTV server 110 provides to end device 100. Processing may proceed from block 404 to block 406.

Block 406 (Transmit Request for Internet Protocol Television Content) may refer to end device 100 transmitting a request for IPTV content to wireless router 105, using information including an IP address of wireless router 105 and a port number of wireless router 105. By way of example, end device 100 may search for and detect the information regarding the IP address and the port number of wireless router 105, when end device 100 is coupled to wireless router 105. Alternatively, a user of end device 100 may already have the information regarding the IP address and the port number of wireless router 105 in advance, before end device 100 is coupled to wireless router 105. Further, the request for the IPTV content may include the IP address and the port number of wireless router 105, the IP address and the port number of IPTV server 110 and a channel identifier of the IPTV content. Processing may proceed from block 406 to block 408.

Block 408 (Transmit Request for Internet Protocol Television Content) may refer to wireless router 105 transmitting a request for the IPTV content to IPTV server 110. In some embodiments, wireless router 105 may detect the IP address of IPTV server 110, the port number of IPTV server 110 and the channel identifier of the requested IPTV content from the request, which may be transmitted from end device 100 at block 406. Then, wireless router 105 may transmit, to IPTV server 110, a request that includes the channel identifier of the requested IPTV content by using the detected IP address and port number of IPTV server 110. Processing may proceed from block 408 to block 410.

Block 410 (Transmit First-Internet Protocol Multicast Stream) may refer to IPTV server 110 transmitting a first-internet protocol multicast stream of the IPTV content to wireless router 105. By way of example, but not limitation, the first-internet protocol multicast stream may include at least one of a UDT broadcast stream or a RTP broadcast stream. In some embodiments, wireless router 105 may receive the first-internet protocol multicast stream via an IGMP implemented between wireless router 105 and IPTV server 110, based on the IP address and the port number of IPTV server 110. Processing may proceed from block 410 to block 412.

Block 412 (Convert First-Internet Protocol Multicast Stream into Second Internet Protocol Unicast Stream) may refer to wireless router 105 converting the first-internet protocol multicast stream into a second-internet protocol unicast stream. By way of example, but not limitation, the second-internet protocol unicast stream may include at least one of a TCP broadcast stream or an HLS broadcast stream.

In some embodiments, wireless router 105 may divide the first-internet protocol multicast stream, and convert the first-internet protocol multicast stream into multiple second-internet protocol packets. Further, wireless router 105 may generate a sequence file to inform end device 100 of a converted sequence of the multiple second-internet protocol packets. By way of example, but not limitation, the second-internet protocol packets may have a moving picture experts group-2 transport stream (MPEG-2 TS) format and the sequence file may have an M3U8 file format. Processing may proceed from block 412 to block 414.

Block 414 (Transmit Second-Internet Protocol Unicast Stream) may refer to wireless router 105 transmitting the second-internet protocol unicast stream to end device 100. In some embodiments, wireless router 105 may transmit the multiple second-internet protocol packets and the sequence file, which are generated at block 412, to end device 100. By way of example, but not limitation, the sequence file may include a URL to be called for the purpose of downloading the multiple second-internet protocol packets. Processing may proceed from block 414 to block 416.

Block 416 (Display Internet Protocol Television Content) may refer to end device 100 displaying the IPTV content. End device 100 may receive the second-internet protocol unicast stream of the IPTV content. By way of example, end device 100 may receive the sequence file, and obtain the URL from the sequence file. Then, end device 100 may call the URL to receive the multiple second-internet protocol packets. End device 100 may decode the multiple second-internet protocol packets and display the IPTV content.

Thus, FIG. 4 shows another example processing flow of operations by which at least portions of a content relaying scheme may be implemented.

Figure 5:
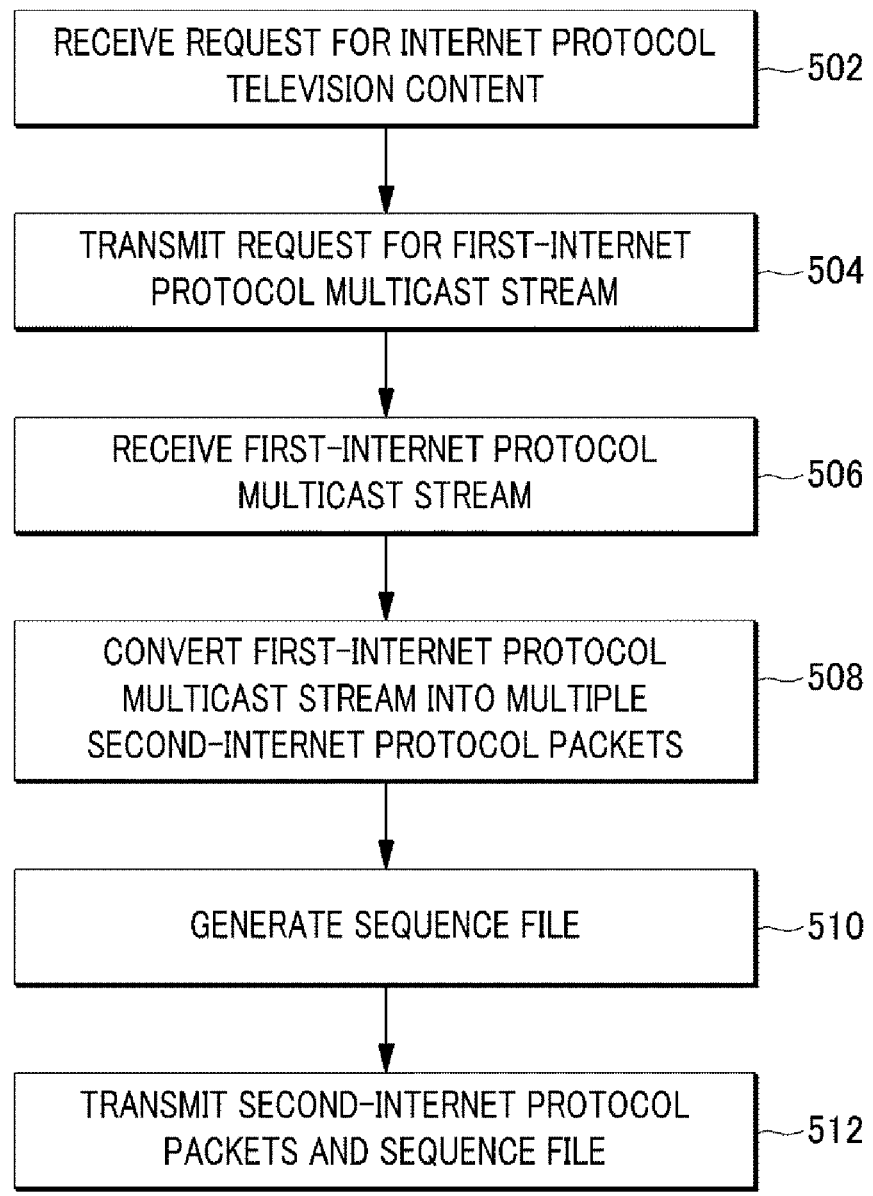
FIG. 5 shows still another example processing flow of operations by which at least portions of a content relaying scheme may be implemented.

FIG. 5 shows still another example processing flow of operations by which at least portions of a content relaying scheme may be implemented. The operations in FIG. 5 may be implemented in wireless router 105 including request receiving unit 210, content receiving unit 220, protocol converting unit 230, transcoding unit 240, transmitting unit 250 and authenticating unit 260, as illustrated in FIG. 2. An example process may include one or more operations, actions, or functions as illustrated by one or more blocks 502, 504, 506, 508, 510 and/or 512. Although illustrated as discrete blocks, various blocks may be divided into additional blocks, combined into fewer blocks, or eliminated, depending on the desired implementation. Processing may begin at block 502.

At block 502 (Receive Request for Internet Protocol Television Content) may refer to request receiving unit 210 receiving a request for IPTV content from end device 100. By way of example, the received request for the IPTV content may include an IP address and a port number of wireless router 105, an IP address and a port number of IPTV server 110 and a channel identifier of the requested IPTV content. Processing may proceed from block 502 to block 504.

At block 504 (Transmit Request for First-Internet Protocol Multicast Stream) may refer to content receiving unit 220 transmitting a request for a first-internet protocol multicast stream of the IPTV content, which may be requested by end device 100 at block 502, to IPTV server 110. By way of example, content receiving unit 220 may transmit, to IPTV server 110, a request that includes the channel identifier of the requested IPTV content by using the IP address and the port number of IPTV server 110. Processing may proceed from block 504 to block 506.

At block 506 (Receive First-Internet Protocol Multicast Stream) may refer to content receiving unit 220 receiving the first-internet protocol multicast stream from IPTV server 110. By way of example, but not limitation, the first-internet protocol multicast stream may include at least one of a UDT broadcast stream or a RTP broadcast stream. Processing may proceed from block 506 to block 508.

At block 508 (Convert First-Internet Protocol Multicast Stream into Multiple Second-Internet Protocol Packets) may refer to protocol converting unit 230 converting the first-internet protocol multicast stream into a second-internet protocol unicast stream. By way of example, but not limitation, the second-internet protocol unicast stream may include at least one of a TCP broadcast stream or an HLS broadcast stream. In some embodiments, protocol converting unit 230 may divide the first-internet protocol multicast stream, and convert the first-internet protocol multicast stream into multiple second-internet protocol packets. By way of example, but not limitation, the second-internet protocol packets may have a moving picture experts group-2 transport stream (MPEG-2 TS) format. Processing may proceed from block 508 to block 510.

At block 510 (Generate Sequence File) may refer to protocol converting unit 230 generating a sequence file to inform end device 100 of a converted sequence of the multiple second-internet protocol packets. By way of example, the sequence file may include index information of each of the multiple second-internet protocol packets and sequence information of the multiple second-internet protocol packets. In some embodiments, protocol converting unit 230 may update the sequence file in real-time or within a predetermined time interval, when protocol converting unit 230 completes converting the first-internet protocol multicast stream into the second-internet protocol packets. By way of example, but not limitation, the sequence file may have an M3U8 file format. Processing may proceed from block 510 to block 512.

At block 512 (Transmit Second-Internet Protocol Packets and Sequence File) may refer to transmitting unit 250 transmitting the multiple second-internet protocol packets and the sequence file to end device 100. Then, frames or content corresponding to the transmitted multiple second-internet protocol packets may be displayed on end device 100, and the sequence file may be stored in a predefined location (e.g., folders) on end device 100.

Thus, FIG. 5 shows still another example processing flow of operations by which at least portions of a content relaying scheme may be implemented.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
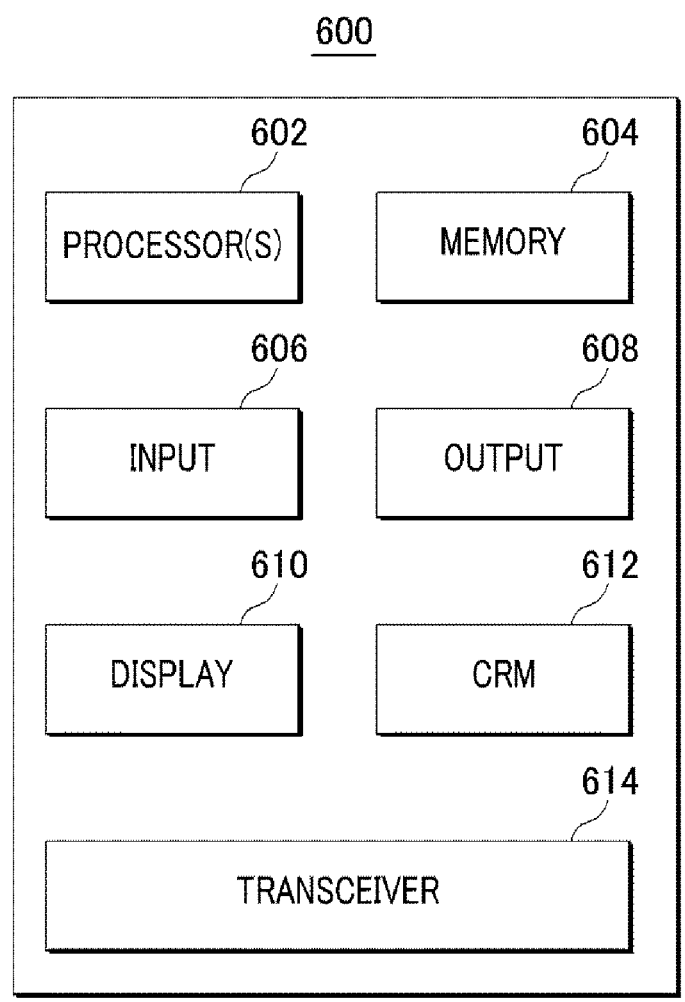
FIG. 6 shows an illustrative computing embodiment, in which any of the processes and sub-processes of a content relaying scheme may be implemented as computer-readable instructions stored on a computer-readable medium.

FIG. 6 shows an illustrative computing embodiment, in which any of the processes and sub-processes of a content relaying scheme may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 10 for transactional permissions.

In a very basic configuration, a computing device 600 may typically include, at least, one or more processors 602, a system memory 604, one or more input components 606, one or more output components 608, a display component 610, a computer-readable medium 612, and a transceiver 614.

Processor 602 may refer to, e.g., a microprocessor, a microcontroller, a digital signal processor, or any combination thereof.

Memory 604 may refer to, e.g., a volatile memory, non-volatile memory, or any combination thereof. Memory 604 may store, therein, an operating system, an application, and/or program data. That is, memory 604 may store executable instructions to implement any of the functions or operations described above and, therefore, memory 604 may be regarded as a computer-readable medium.

Input component 606 may refer to a built-in or communicatively coupled keyboard, touch screen, or telecommunication device. Alternatively, input component 606 may include a microphone that is configured, in cooperation with a voice-recognition program that may be stored in memory 604, to receive voice commands from a user of computing device 600. Further, input component 606, if not built-in to computing device 600, may be communicatively coupled thereto via short-range communication protocols including, but not limitation, radio frequency or Bluetooth.

Output component 608 may refer to a component or module, built-in or removable from computing device 600, that is configured to output commands and data to an external device.

Display component 610 may refer to, e.g., a solid state display that may have touch input capabilities. That is, display component 610 may include capabilities that may be shared with or replace those of input component 606.

Computer-readable medium 612 may refer to a separable machine readable medium that is configured to store one or more programs that embody any of the functions or operations described above. That is, computer-readable medium 612, which may be received into or otherwise connected to a drive component of computing device 600, may store executable instructions to implement any of the functions or operations described above. These instructions may be complimentary or otherwise independent of those stored by memory 604.

Transceiver 614 may refer to a network communication link for computing device 600, configured as a wired network or direct-wired connection. Alternatively, transceiver 614 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A system, comprising:
an internet protocol television server configured to:
receive authenticating information from a wireless router;
compare stored authenticating information with the received authenticating information;
authenticate the wireless router based at least in part on authenticating information of the wireless router, wherein the authenticating information of the wireless router includes a unique identifier of the wireless router,
authenticate an end device based at least in part on authenticating information of the end device, wherein the authenticating information of the end device includes a unique identifier of the end device, and
transmit a first-internet protocol multicast stream of internet protocol television content; the wireless router configured to:
analyze a header layer of the first-internet protocol multicast stream, wherein the header information includes at least one of a sequence number of the first-internet protocol multicast stream or a time stamp value pertaining to an image frame encoding frequency of the IPTV content;
receive, from the internet protocol television server, the first-internet protocol multicast stream,
wherein the first-internet protocol multicast stream includes at least one of a UDT broadcast stream or a RTP broadcast stream;
convert the first-internet protocol multicast stream into a second-internet protocol unicast stream, and
transmit the second-internet protocol unicast stream via a wireless network; and an end device configured to:
transmit a request for the internet protocol television content to the wireless router, and receive the second-internet protocol unicast stream from the wireless router;
wherein the second-internet protocol unicast stream includes at least one of a TCP broadcast stream or an HLS broadcast stream.

2. The system of claim 1, wherein the wireless router is further configured to:
convert the first-internet protocol multicast stream into a plurality of second-internet protocol packets;
generate a sequence file to inform the end device of a converted sequence of the plurality of second-internet protocol packets; and
transmit the sequence file to the end device.

3. The system of claim 1, wherein the internet protocol television server is further configured to transmit, to the end device, channel information that includes at least one of an internet protocol address, a port number or a channel identifier,
wherein the request for the internet protocol television content from the end device includes the channel information, and
wherein the wireless router is further configured to transmit a request for the first-internet protocol multicast stream to the internet protocol television server based at least in part on the received channel information.

4. The system of claim 1, wherein the internet protocol television server is further configured to transmit, to the wireless router, channel information that includes at least one of an internet protocol address, a port number or a channel identifier, and
wherein the wireless router is further configured to transmit a request for the first-internet protocol multicast stream to the internet protocol television server based at least in part on the channel information.

5. The system of claim 1, wherein the wireless router is further configured to transcode a first encoding type of the first-internet protocol multicast stream to a second encoding type to be decoded by the end device.

6. A method performed under control of a wireless router, comprising: receiving authenticating information from the wireless router;
compare stored authenticating information with the received authenticating information;
authenticating the wireless router with an internet protocol television server using authenticating information of the wireless router, wherein the authenticating information of the wireless router includes a unique identifier of the wireless router;
receiving a request for internet protocol television content from an end device that is authenticated by the internet protocol television server, wherein the end device is authenticated using authenticating information of the end device and the authenticating information of the end device includes a unique identifier of the end device;
receiving a first-internet protocol multicast stream of the requested internet protocol television content from the internet protocol television server;
analyzing a header layer of the first-internet protocol multicast stream, wherein the header information includes at least one of a sequence number of the first-internet protocol multicast stream or a time stamp value pertaining to an image frame encoding frequency of the IPTV content;

wherein the first-internet protocol multicast stream includes at least one of a UDT broadcast stream or a RTP broadcast stream;
converting the first-internet protocol multicast stream into a second-internet protocol unicast stream; and
transmitting the second-internet protocol unicast stream to the authenticated end device via a wireless network.

7. The method of claim 6, wherein the converting of the first-internet protocol multicast stream includes:
converting the first-internet protocol based multicast stream into a plurality of second-internet protocol packets; and
generating a sequence file to inform the end device of a converted sequence of the plurality of second-internet protocol packets, and
wherein the transmitting of the second-internet protocol based unicast stream includes transmitting the sequence file.

8. The method of claim 7, further comprising:
updating the sequence file.

9. The method of claim 7, further comprising:
transmitting authenticating information of the wireless router to the internet protocol television server,
wherein the first-internet protocol multicast stream is received from the internet protocol television server when the wireless router is authenticated.

10. The method of claim 6,
wherein the received request for the internet protocol television content includes at least one of an internet protocol address, a port number or a channel identifier, and
the method further comprises transmitting of a request for the first-internet protocol multicast stream.

11. The method of claim 6, further comprising:
transcoding a first encoding type of the first-internet protocol multicast stream to a second encoding type to be decoded by the end device.

* * * * *

UNITED STATES PATENT AND TRADEMARK OFFICE
CERTIFICATE OF CORRECTION

PATENT NO.         : 9,237,382 B2                                   Page 1 of 2
APPLICATION NO.    : 14/067258
DATED              : January 12, 2016
INVENTOR(S)        : Jong-heum Kim et al.

It is certified that error appears in the above-identified patent and that said Letters Patent is hereby corrected as shown below:

Claims

Column 13, line 39 through Column 14, line 8, Claim 1

-- 1. (Currently Amended) A system, comprising:

an internet protocol television server configured to:

receive authenticating information from a wireless router, compare stored authenticating information with the received authenticating information, authenticate the wireless router based at least in part on authenticating information of the wireless router, wherein the authenticating information of the wireless router includes a unique identifier of the wireless router, authenticate an end device based at least in part on authenticating information of the end device, wherein the authenticating information of the end device includes a unique identifier of the end device, and transmit a first-internet protocol multicast stream of internet protocol television content;

the wireless router configured to:

analyze a header layer of the first-internet protocol multicast stream, wherein the header information includes at least one of a sequence number of the first internet protocol multicast stream or a time stamp value pertaining to an image frame encoding frequency of the IPTV content;

receive, from the internet protocol television server, the first-internet protocol multicast stream, Signed and Sealed this
Twelfth Day of April, 2016

Michelle K. Lee
*Director of the United States Patent and Trademark Office*

CERTIFICATE OF CORRECTION (continued)
U.S. Pat. No. 9,237,382 B2 wherein the first internet protocol multicast stream includes at least one of a UDT broadcast stream or a RTP broadcast stream;

convert the first-internet protocol multicast stream into a second-internet protocol unicast stream, and transmit the second-internet protocol unicast stream via a wireless network; and an end device configured to:

transmit a request for the internet protocol television content to the wireless router, and receive the second-internet protocol unicast stream from the wireless router. --.

Column 14, delete lines 6-8

"wherein the second internet protocol unicast stream includes at least one of a TCP broadcast stream or an HLS broadcast stream".